United States Patent
Huang et al.

(10) Patent No.: US 7,550,186 B2
(45) Date of Patent: Jun. 23, 2009

(54) ANGLE-LAMINATED COMPOSITE TUBE WITH DOUBLE LAYER OF MATERIALS

(75) Inventors: Mau-Yi Huang, Banciao (TW);
Geng-Wen Chang, Taipei (TW);
Chih-Chin Lu, Jhonghe (TW);
Guang-Shyang Ger, Banciao (TW)

(73) Assignee: Chung Shan Institute of Science and Technology, Taoyuan County (TW)

( * ) Notice: Subject to any disclaimer, the term of this patent is extended or adjusted under 35 U.S.C. 154(b) by 552 days.

(21) Appl. No.: 11/291,772

(22) Filed: Dec. 2, 2005

(65) Prior Publication Data
US 2007/0128392 A1    Jun. 7, 2007

(51) Int. Cl.
B29D 22/00     (2006.01)
B29D 23/00     (2006.01)
B32B 1/08      (2006.01)

(52) U.S. Cl. .............. 428/36.91; 428/105; 428/141; 428/147; 428/297.4; 428/299.1; 428/300.7; 428/408

(58) Field of Classification Search ......... 428/36.9, 428/36.91, 105, 36.3, 141, 147, 212, 213, 428/220, 297.4, 299.1, 300.7, 408
See application file for complete search history.

(56) References Cited

U.S. PATENT DOCUMENTS 4,858,635 A    8/1989  Eppenbach
5,683,799 A    11/1997 Olinger
6,013,361 A    1/2000  Seal et al.
2004/0081783 A1 *  4/2004  Prince ............... 428/36.9

OTHER PUBLICATIONS

Kang et al., *Autoclave Processing of Thick Carbon-Phenolic Composites*, ASME 1995, MD-vol. 56. Recent Advances in Composite Materials, pp. 119-131.
Graven et al., *Development and Certification of the Space Shuttle Redesigned Solid Rocket Motor Nozzle*, 1989, American Institute of Agronomics and Astronautics, Inc., 1989, AIAA-89-2418, 13 Pages.
Nasa, Marshall Space Flight Center, *Application of Ablative Composites to Nozzles for Reusable Solid Rocket Motors*, Practice No. PD-ED-1218, pp. 1-8.

* cited by examiner

Primary Examiner—Michael C Miggins
(74) Attorney, Agent, or Firm—Rabin & Berdo, P.C.

(57) ABSTRACT

An angle-laminated composite tube with double layer of materials uses an inner layer material and an outer layer material with different functional properties. The two materials are cut into a plurality of slices in a specific shape. They are laminated alternately with a mismatching angle inside a mold with a specific angle to form a laminated assembly. Finally, a hot press is used to cure the laminated assembly into a structure with an inner layer, an outer layer, and an interlacing layer. The slice shape of the inner layer material and the outer layer material is specifically designed so that the inner layer, the outer layer, and the interlacing layer receive an even pressure during the curing process, rendering desired densities in the layers. The angle-laminated composite tube can achieve a high structural strength, with the inner and outer parts satisfying different functional needs.

8 Claims, 4 Drawing Sheets

ANGLE-LAMINATED COMPOSITE TUBE WITH DOUBLE LAYER OF MATERIALS

BACKGROUND OF THE INVENTION

1. Field of the Invention

The invention relates to a composite material tube and, in particular, to an angle-laminated composite tube with double layer of materials.

2. Related Art

Phenolic resin composite materials are conventionally known for its thermal insulating and flame retardant characteristics, and are conventionally used in aerospace and defense industries, such as fireproof materials in commercial aircrafts, thermal insulator in missiles and rocket launching systems, heat shields of metallic structures in human or unmanned space vehicles, etc.

Carbon fiber fabrics and phenolic resin are usually combined to form a composite material that has advantageous mechanical and thermal properties, the carbon fiber fabrics being able to resist to temperatures above 2000° C. within a short duration and offer superior mechanical strength. This type of composite materials thus has become the principal thermal insulator in aerospace and defense technologies. Industrialized countries thus have put major investments in the development of this material with respect to every aspect including the raw material, the manufacture process, or the assembly of component parts.

U.S. Pat. No. 6,013,361 disclosed an autoclave process for manufacturing a carbon fabric reinforced phenolic resin composite which has porosity of at least 4% by volume. Network pores of the composite material allow of volatile gas escape. When the composite material is heated, the volatile formed by decomposition of phenolic resin in the composite material at high temperature is released via the network pores, so that the composite material can sustain a sufficient strength under high temperature. This type of composite material can be used in fireproof structures of Space Shuttles.

In the reference of Recent Advances in Composites Materials(ASME MD-Vol 56, 1995) disclosed by Daewoo Heavy Industries, Ltd, the ablative heat shield of a rocket launching system applies a composite thermal insulating structure, composed of a sandwich structure design, which is surface coated with a 15 mm-thick parallel laminated carbon fiber fabric reinforced phenolic resin composite by autoclave process.

In addition to the influence of the raw material and the manufacture process on characteristics of the carbon fabric reinforced phenolic resin composite, the external heat source and the orientation of fiber are also factors which determine the thermal insulating characteristics of the composite. The AIAA-89-2418 reference indicates that the 3.7 m diameter solid rocket booster (SRB) of Space Shuttle uses an ablative throat insert made of carbon fabric reinforced phenolic resin composite material, which the optimal angles between the plies and the flame surface in SRB nozzles has been proven to be between 30 degrees and 60 degrees, depending upon the location, contour and heating conditions at various sections of the nozzle.

NASA PD-ED-1218 discloses a rocket nozzle in which an ablative part with ply angle of 45 degree is manufactured by using a tape wrapper to attach 45 degree bias-cut tapes over a mandrel and curing with a hydroclave.

U.S. patent application Ser. No. 11/002,152 discloses a method to fabricate a laminated composite tube with an arranged ply angle. In this method, carbon fabric reinforced phenolic prepregs were first cut into fan-shaped pieces and laminated in a mold including a concave female mold and a convex male mold both have a tapered angle $\Phi$. Hot press molding with pressure over 140.6 kg/cm2 is then used for solidifying the lamina assembly to get the composite hollow cylinder with arranged ply angle $\Phi$.

The techniques disclosed in the above-mentioned patent and references are used in making the thermal insulating layer components of nozzles. Using the carbon fiber fabric reinforced phenolic resin prepregs along with an appropriately designed ply angle can achieve the required ablation resistance. However, it is still insufficient for thermal insulation. Therefore, they have to be covered with a thermal insulating layer to protect the metal structure outside it, thus forms a double-layer structure. The reference AIAA-89-2418 shows that the U.S. space shuttle uses glass or silica fiber reinforced phenolic resin composite as the thermal insulation of the carbon fiber reinforced phenolic resin composite liner. The production method is to apply a coat of phenolic resin on the machined surface of the cured carbon phenolic composite, followed by tape wrapping the glass of silica phenolic tape, and finally the second curing process by autoclave. Instead of the second curing process, the angle-laminated composite tube disclosed in U.S. patent application Ser. No. 11/002,152 uses carbon phenolic and silica phenolic composite materials produced separately. Each of them is machined before being combined using an adhesive to form a double-layer structure. These prior arts require either second curing or additional machining and gluing processes, costing a lot of manpower. Moreover, if the inner and outer layers differ very much in properties, then there may remain an extremely high thermal stress at the interface. More seriously, the interface may crack and affect its strength. These are problems to be solved.

SUMMARY OF THE INVENTION

In view of the foregoing, an object of the invention is to provide an angle-laminated composite tube with double layer of materials that involves only one curing process.

To achieve the above object, the disclosed angle-laminated composite material tube with double layer of materials (also referred to herein as "angle-laminated composite tube") includes a plurality of inner layer material slices and a plurality of outer layer material slices. Each of the inner layer material slices is comprised of a fan-shaped inner layer body portion (also referred to herein as "inner layer portion") and a fan-shaped inner layer interlacing portion (also referred to herein as "first interlacing portion"). The inner layer body portion covers a fan angle $\theta_i$. The inner layer interlacing portion is on the outer side of the inner layer body portion, covering a fan angle $\alpha_i$. Each of the outer layer material slices is comprised of a fan-shaped outer layer body portion (also referred to as "outer layer portion") and a fan-shaped outer layer interlacing portion (also referred to as "second interlacing portion"). The outer layer body portion, covers a fan angle $\theta_o$. The outer layer interlacing portion is on the inner side of the outer layer body portion, covering a fan angle $\alpha_o$. The inner layer has a cured single layer thickness $T_i$ under an appropriate pressure. The outer layer has a cured single layer thickness $T_o$ under an appropriate pressure.

The inner layer material slices and the outer layer material slices are laminated in an interlacing way in a mold with a specific angle $\phi$. Rows of the inner layer material slices and rows of the outer layer material slices are displaced by a mismatching angle $\beta_i$ and $\beta_o$, respectively, so that the inner layer interlacing portion and the outer layer interlacing portion partially overlap with each other. Finally, the laminated assembly is cured by the hot press.

In order for the inner layer, the outer layer, and the interlacing layer of the products to reach expected densities, the above-mentioned quantities $\theta_o$, $T_o$, $\alpha_o$, $\theta_i$, $T_i$, $\alpha_i$, $\beta_o$, and $\beta_i$ have to satisfy specific conditions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The invention employs an alternate laminating method that combines the inner and outer materials of different properties to obtain an angle-laminated composite material tube with double layer of materials.

In the following, we describe how the inner layer, the outer layer, and the interlacing layer can be cured by uniform pressure.

Figure 1:
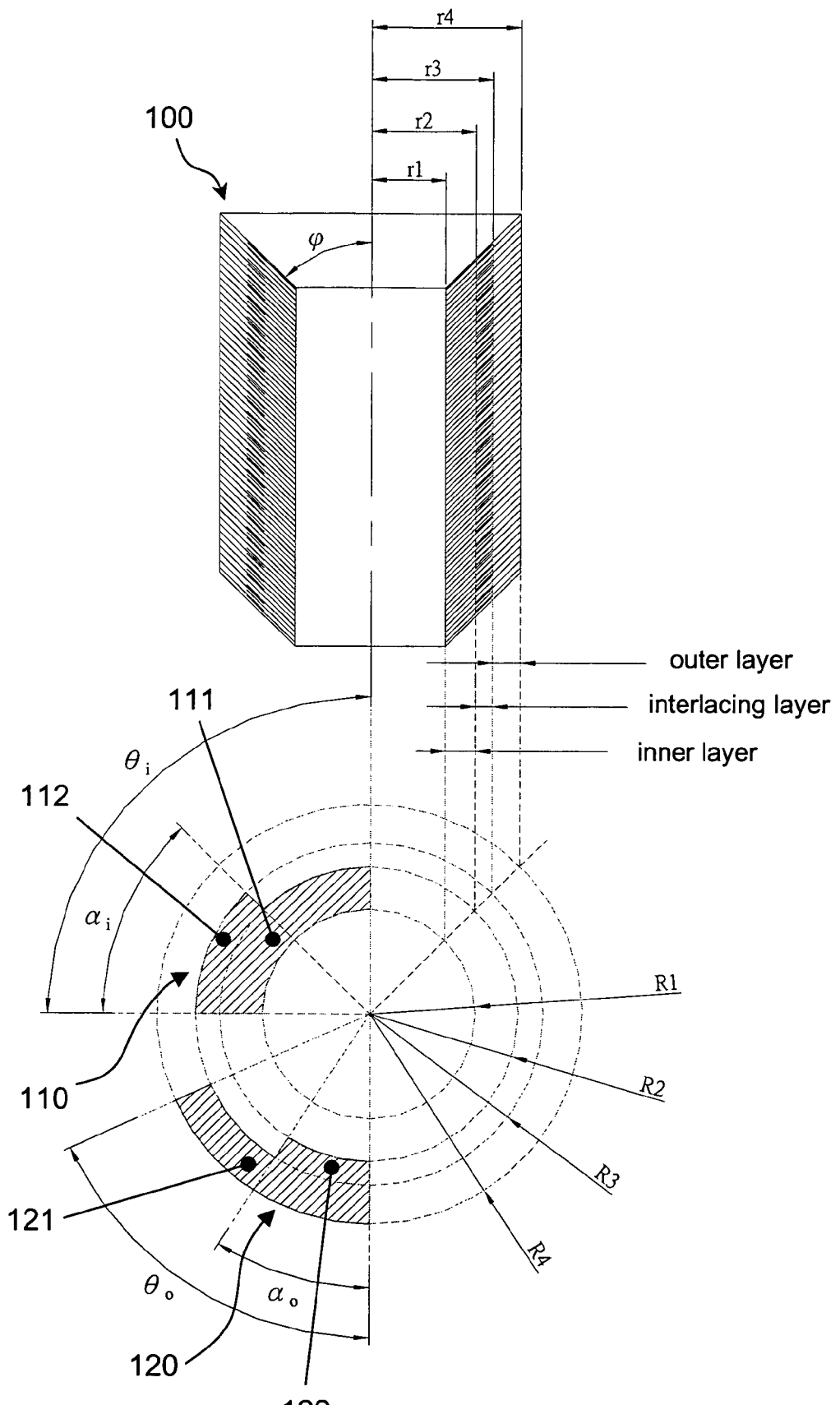
FIG. 1 is a shape designs of the inner/outer layer material slices of the invention.
Figure 2:
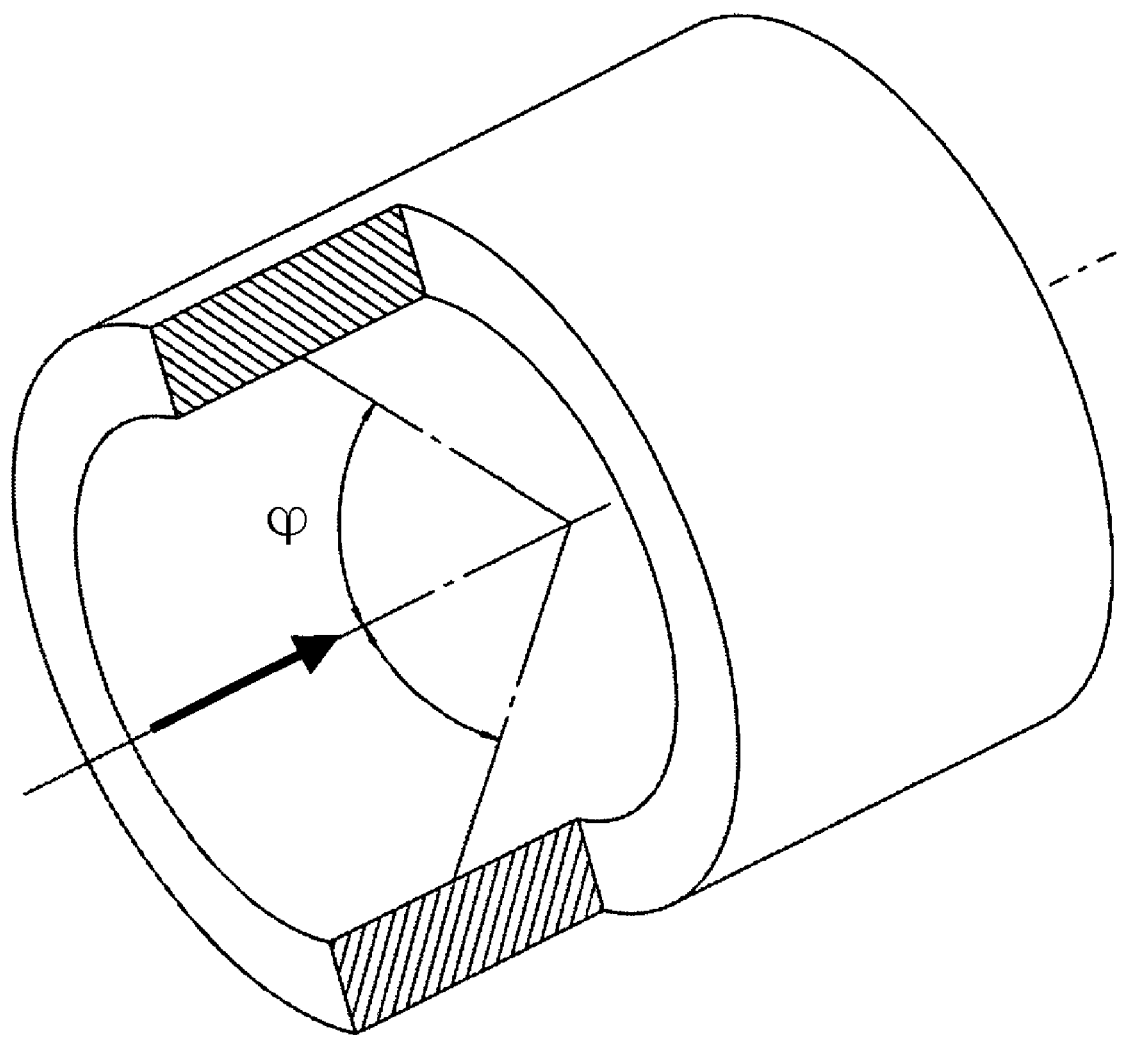
FIG. 2 is a schematic view showing the ply angle of composite tube and the direction of the heat source.

With references to FIG. 1 the invention alternately laminates inner layer material slices 110 and outer layer material slices 120 to obtain the composite material tube.

The thickness of the inner layer material slices 110 after cured is $T_i$. The thickness of the outer layer material slices 120 after cured is $T_o$. The inner layer material slice 110 and the outer layer material slice 120 have respectively an inner layer body portion 111, an outer layer body portion 121, the inner layer interlacing portion 112 and the outer layer interlacing portion 122 that partially overlap with each other while laminating. Other known information includes the product inner diameter r1, outer diameter r4, and the inner diameter of the interlacing layer r2, and the outer diameter of the interlacing layer r3, as shown in the drawing.

Those diameters of R1, R2, R3, and R4 of the inner/outer layer material slices are in the following relationships:

$$R1 = r1/\sin\phi;\ R2 = r2/\sin\phi;\ R3 = r3/\sin\phi;\ R4 = r4/\sin\phi \quad \text{(Equation 1)}$$

Under appropriate curing pressure, the thickness of the inner, outer, and interlacing layers should be equal. Therefore, the fan angle $\theta_i$ of inner layer body portion, the fan angle $\alpha_i$ of inner layer interlacing portion, the fan angle $\theta_o$ of outer layer body portion, the fan angle $\alpha_o$ of outer layer interlacing portion, the mismatching angle $\beta_o$ of outer layer, and the mismatching angle $\beta_i$ of inner layer have to satisfy the following formula:

$$\frac{\theta_o T_o}{\beta_o} = \frac{\theta_i T_i}{\beta_i} \quad \text{(Equation 2)}$$

$$= \frac{\alpha_o T_o}{\beta_0} + \frac{\alpha_i T_i}{\beta_i}$$

In practice, one may take $\beta_o = \beta_i = 2\beta$. That is, the inner and outer layers use the same mismatching angle. The Eq. (2) becomes $$\theta_o T_o = \theta_i T_i = \alpha_o T_o + \alpha_i T_i \quad \text{(Equation 2a)}$$

Figure 3:
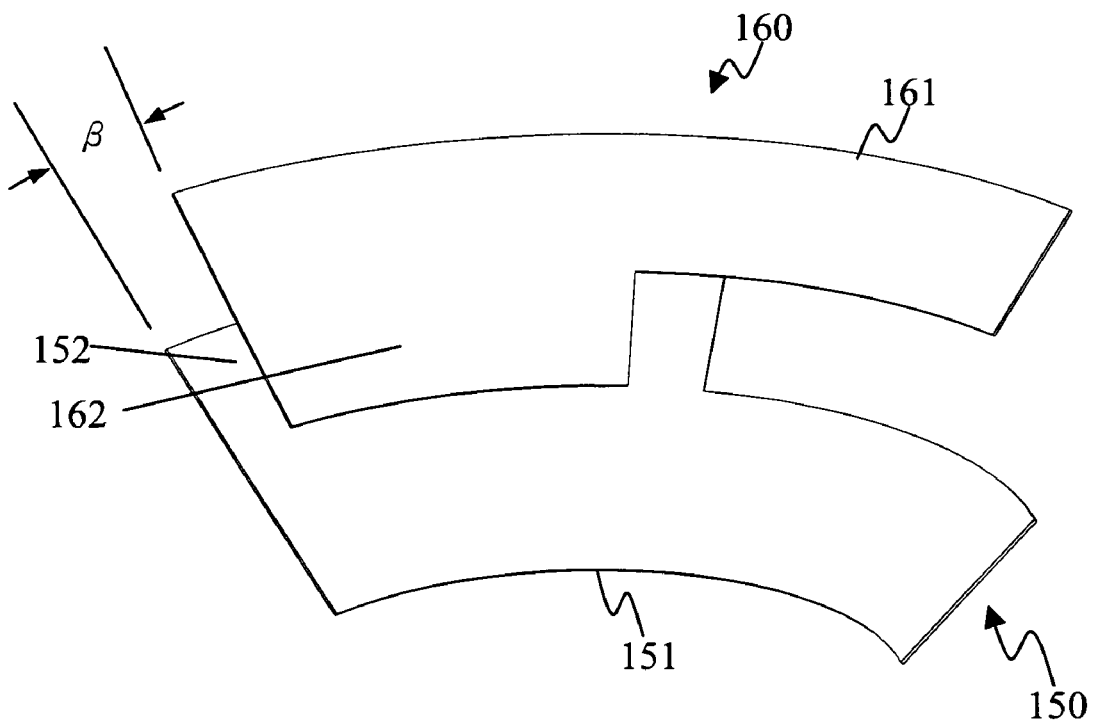
FIGS. 3 and 4 are schematic views of the arrangement process in an embodiment of the invention.

With reference to FIG. 3, the angle-laminated method of the invention is as follows. The first piece is the inner layer material slice 150. It has an inner layer body portion 151 covering a larger fan angle and an inner layer interlacing portion 152 on the outer side of the inner layer body portion 151 and covering a smaller fan angle. Its right border is formed with a fan-shaped opening area.

The second piece is the outer layer material slice 160 laminated on the first piece of the inner layer material slice 150. The two are mismatched by an angle β (their alignment may be achieved using cuts). The outer layer material slice 160 has an outer layer body portion 161 on the outer side and covering a larger fan angle and an outer layer interlacing portion 162 on the inner side, partially overlapping with the inner layer interlacing portion 152, and covering a smaller fan angle. Its right border is formed with a fan-shaped opening area.

Figure 4:
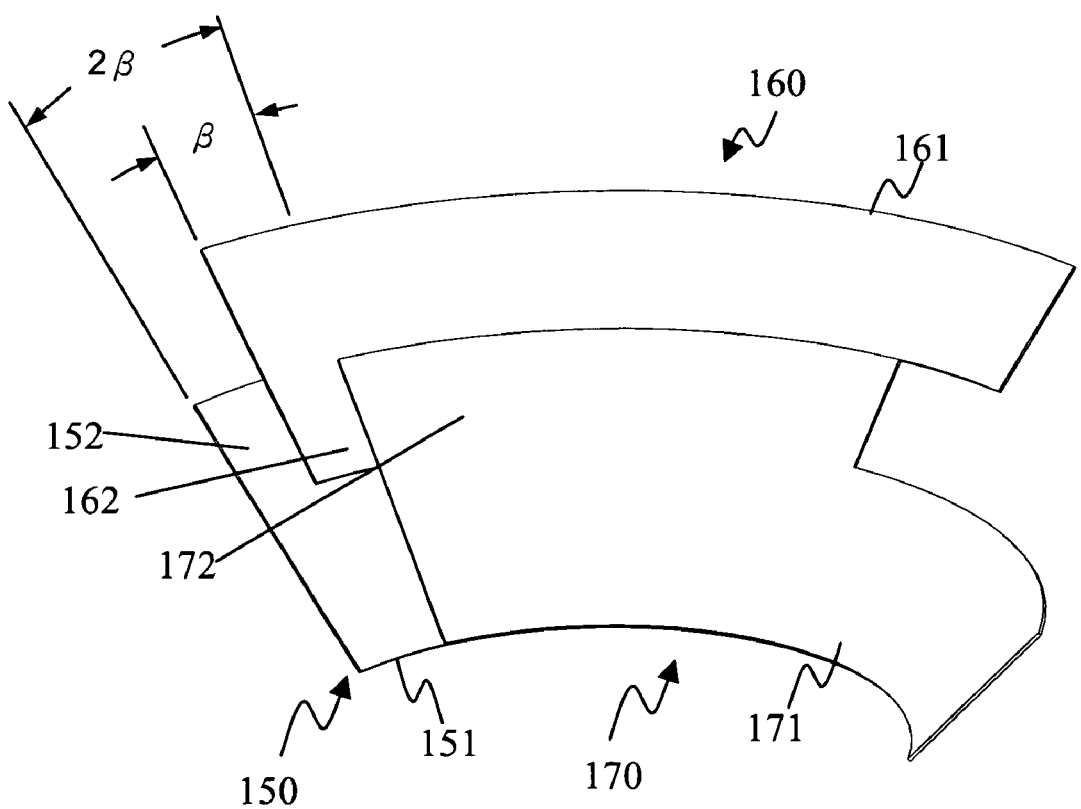

With reference to FIG. 4, the third piece is the inner layer material slice 170 displaced from the second piece of the outer layer material slice 160 by a mismatching angle β. Its inner layer body portion 171 and the inner layer body portion 151 of the first piece of the inner layer material slice 150 partially overlap. The inner layer interlacing portion 172 on the outer side partially overlaps with the inner layer interlacing portion 152 of the first piece of the inner layer material slice 150 and the outer layer interlacing portion 162 of the second piece of the outer layer material slice 160.

The rests are the same. The mismatching angle $\beta_i$ of each inner layer material and the mismatching angle $\beta_o$ of each outer layer material are both equal to 2β. Therefore, as long as each parameter satisfies Eqs. (1) and (2a), then the inner layer, the outer layer, and the interlacing layer after cured can achieve the desired densities. The fibers are disposed in accordance with the predetermined ply angle. This renders the disclosed angle-laminated composite tube with double layer of materials.

To illustrate the feasibility of the invention, we use an embodiment to explain the disclosed processes. To obtain the disclosed angle-laminated composite tube with double layer of materials, it is necessary to go through (1) material preparation, (2) designs of inner and outer layer material slices, and (3) laminating and curing. They are further described as follows.

EMBODIMENT (1) Material Preparation

In this example, the inner layer material is a carbon fabric/phenolic resin prepregs, and the outer layer material is a silica fabric/phenolic resin prepregs. In practice, the inner and outer layer materials may be other sheet-shaped fiber fabric reinforced resin prepregs that have the desired functions. The two fiber fabrics are both 8 harness satins. The inner layer material is PAN-based 3K carbon fibers. The outer layer material is highly pure (over 98%) silica fabrics. The two phenolic resins are prepared from ammonia ($NH_4OH$), formaldehyde, and phenol by condensation polymerization. The carbon fabric/phenolic resin prepregs has a resin content of about 35 to 40%. The silica fabric/phenolic resin prepregs has a resin content of about 32 to 36%.

(2) Designs of Inner and Outer Layer Material Slices

For the finish product, the inner diameter r1=19 mm, the outer diameter r4=38 mm, the interlacing layer inner diameter r2=27 mm, the interlacing layer outer diameter r3=32 mm, and φ=45°.

(A) According to Eq. (1), we can get:

R1=r1/sin φ=27 mm, R2=r2/sin φ=38 mm,
R3=r3/sin φ=45 mm, R4=r4/sin φ=54 mm (Round)

Figure 5:
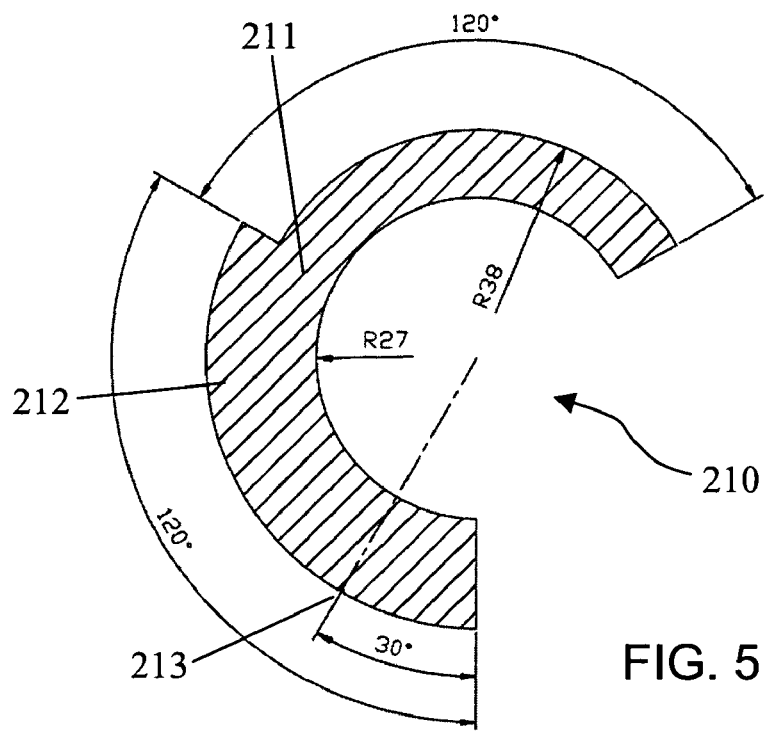
FIGS. 5 and 6 show the shapes and sizes of the inner/outer layer material slices of an embodiment of the invention.

(B) The inner layer material slice 210 is shown in FIG. 5. The design is as follows. In this embodiment, the inner layer material is a carbon fabric/phenolic resin prepregs. The single layer average cured thickness $T_i$ is about 0.36 mm. The fan angle $\theta_i$ of inner layer body portion 211 of the inner layer material slice 210 is chosen to be 240°. The fan angle $\alpha_i$ of inner layer interlacing portion 212 may be chosen to be half of that, i.e., 120°. In this case, the mismatching angle β between the adjacent inner layer material and outer layer material is chosen to be 30°, i.e., the inner layer mismatching angle $\beta_i=2\beta=60°$. A cut mark 213 is formed on the border at the angle of 30° for alignment. Note that the values for angles $\theta_i$, $\alpha_i$ and $\beta_i$ can be arbitrarily chosen, so long as the size of the slice and the amount of overlap between adjacent slices are appropriate. Note that the values for angles θi, αi and βi can be arbitrarily chosen, so long as the size of the slice and the amount of overlap between adjacent slices are appropriate.

Figure 6:
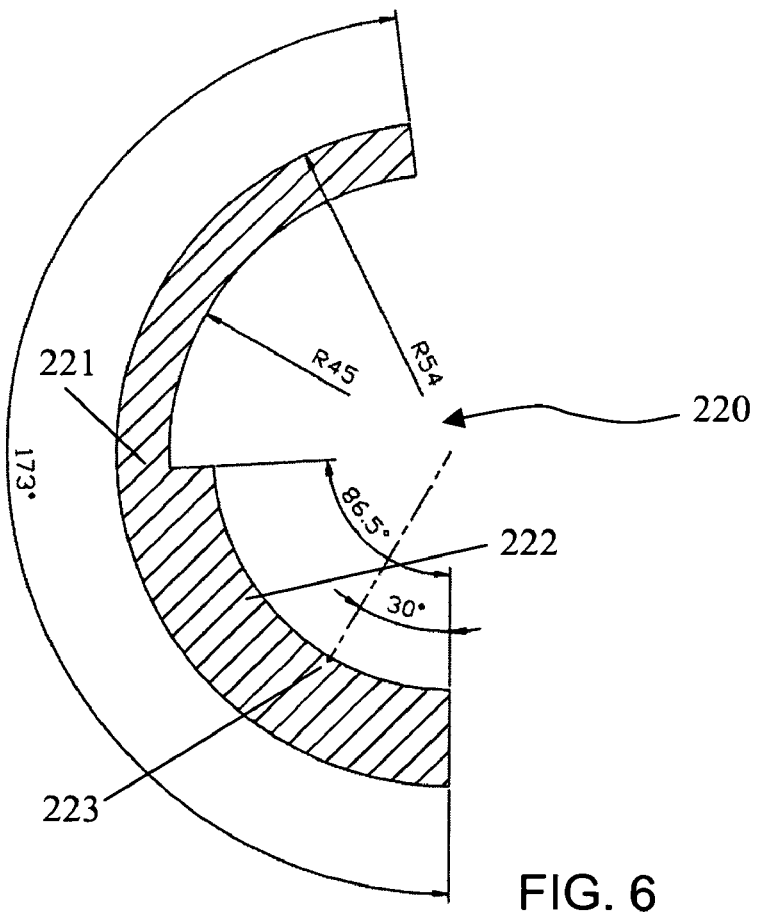

(C) The outer layer material slice 220 is shown in FIG. 6. Its design is as follows. The outer layer material is silica fabric/phenolic resin prepregs with a cured thickness $T_o$ about 0.50 mm. The mismatching angle β between the adjacent inner layer material and outer layer material is also 30°, i.e., the outer layer mismatching angle $\beta_o=2\beta=60°$. Also, a cut mark 223 is formed at the 30° of the inner border. The fan angles $\theta_o$ and $\alpha_o$ have to be computed using Eq. (2a). Since the fan angle $\theta_i$ of inner layer body portion is 240°, the fan angle $\theta_o$ of outer layer body portion 221 has to be 240°×0.36/0.5=173°. Likewise, since the fan-shaped angle $\alpha_i$ of inner layer interlacing portion is 120°, the fan angle $\alpha_o$ of outer layer interlacing portion 222 has to be 86.5°.

It should be mentioned that $\alpha_i$ is not necessary one half of $\theta_i$. For example, $\alpha_i$ can be determined by considering the thermal expansion coefficients of the inner/outer layer materials. Suppose the thermal expansion coefficient of the inner layer material is smaller, then $\alpha_i$ can have a larger value. Since Eq. (2) has to be satisfied, $\alpha_o$ is correspondingly smaller to reduce the thermal stress of the products.

(D) Curing Pressure Check

The thickness ratio of the inner layer, the outer layer, and the interlacing layer are:

$$\frac{\theta_i T_i}{\beta_i} : \frac{\theta_o T_o}{\beta_o} : \frac{\alpha_i T_i}{\beta_i} + \frac{\alpha_o T_o}{\beta_o} = \frac{240 \times 0.36}{60} : \frac{173 \times 0.50}{60} : \frac{120 \times 0.36}{60} + \frac{86.5 \times .50}{60}$$

$$= 1.44 : 1.44 : 1.44$$

$$= 1 : 1 : 1$$

Therefore, the curing pressure will be uniformly distributed.

(3) Laminating and Curing

The shapes of the above-mentioned inner/outer layer material slices are used to design the knife mold. Punching machines are employed to mass produce the inner and outer layer material slices 210, 220. The quantities can be computed from the lengths of tubes. The inner/outer layer material slices are then laminated in the above-mentioned method inside a mold with a 45-degree angle. Finally, a hot press is used to heat and press them for curing. The curing temperature and pressure are as follows. After preheating for 20 minutes at 90° C., a 3000 psi curing pressure is imposed, followed by raising the temperature to 150° C. at the rate of 2° C./min. The temperature is then maintained for 3 hours. Finally, the mold is removed after cooling. The outer layer of this product (silica fabric/phenolic resin composite material) can withstand temperatures as high as 1500° C. and has a low thermal conductivity. The inner layer (carbon fabric/phenolic resin composite material) is resistant to ablation and can withstand temperatures as high as 2500° C. This enables the inner and outer parts of the tube to satisfy different functional needs. Besides, the interlacing layer is a layer with the two materials laminated alternately, bringing the two materials tightly into an integrally formed structure. The density of the inner layer material is measured to be 1.45 $g/cm^3$ (typical carbon fiber reinforced phenolic composite material density is 1.4 to 1.5 $g/cm^3$). The density of the outer layer material is measured to be 1.60 $g/cm^3$ (typical silica fabric reinforced phenolic composite material density is 1.6 to 1.7 $g/cm^3$). This shows that the curing pressure of each layer is appropriately established.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An angle-laminated composite tube, comprising:
  a plurality of first slices made of a first material, each of the first slices including a fan-shaped inner layer portion and a fan-shaped first interlacing portion, the first interlacing portion being arranged on an outer side of the inner layer portion, and the inner layer portions forming an inner layer of the composite tube; and
  a plurality of second slices made of a second material different than the first material, each of the second slices including a fan-shaped outer layer portion and a fan-shaped second interlacing portion, the second interlacing portion being arranged on an inner side of the outer layer portion, the outer layer portions of the second slices forming an outer layer of the composite tube, the interlacing portions of the first and second slices forming an interlacing layer of the composite tube;
wherein:
  the first slices and the second slices are angle-laminated alternatively at a specified ply angle relative to the center axis of the composite tube,
  two adjacent first slices are mismatched by a first mismatching angle along the circumference direction of the composite tube,
  two adjacent second slices are mismatched by a second mismatching angle along the circumference direction of the composite tube, the interlacing portions of the first slices and the interlacing portions of the respectively adjacent second slices partially overlap with each other, thereby forming the interlacing layer composed of overlapped portions of the first slices and the second slices; and cured thicknesses of the inner layer, the outer layer and the interlacing layer are substantially the same.

2. The angle-laminated composite tube according to claim 1, wherein an outer border of the first slice and an inner border of the second slice have respectively a cut mark for alignment.

3. The angle-laminated composite tube according to claim 1, wherein the first material is carbon fabric/phenolic resin prepregs.

4. The angle-laminated composite tube according to claim 1, wherein the second material is silica fabric/phenolic resin prepregs.

5. The angle-laminated composite tube according to claim 3, wherein the second material is silica fabric/phenolic resin prepregs.

6. The angle-laminated composite tube according to claim 1, wherein the first and second mismatching angles, represented by $\beta_i$ and $\beta_o$ respectively, satisfy a formula:

$$\frac{\theta_o T_o}{\beta_o} = \frac{\theta_i T_i}{\beta_i}$$
$$= \frac{\alpha_o T_o}{\beta_0} + \frac{\alpha_i T_i}{\beta_i},$$

where:

$T_i$ represents a cured thickness of the first slice;

$\theta_i$ represents a fan angle of the inner layer portion of the first slice;

$\alpha_i$ represents a fan angle of the first interlacing portion of the first slice;

$T_o$ represents a cured thickness of the second slice;

$\theta_o$ represents a fan angle of the outer layer portion of the second slice;

$\alpha_o$ represents a fan angle of the second interlacing portion of the second slice.

7. The angle-laminated composite tube according to claim 1, wherein:

an outer diameter of the inner layer portion of each of the first slices is equal to an inner diameter of the adjacent second slice; and an outer diameter of each of the first slice is equal to an outer diameter of the second interlacing portion of the adjacent second slice.

8. The angle-laminated composite tube according to claim 7, wherein the ply angle, represented by $\phi$, satisfies relations:

$$R1 = r1/\sin\phi,$$

$$R2 = r2/\sin\phi,$$

$$R3 = r3/\sin\phi, \text{ and}$$

$$R4 = r4/\sin\phi,$$

where:

R1 represents an inner diameter of the first slice;

R2 represents the outer diameter of the inner layer portion of the first slice;

R3 represents the outer diameter of the first slice;

R4 represents an outer diameter of the second slice;

r1 represents an inner diameter of the angle-laminated composite tube;

r2 represents an inner diameter of the interlacing layer of the angle-laminated composite tube;

r3 represents an outer diameter of the interlacing layer of the angle-laminated composite tube; and r4 represents an outer diameter of the angle-laminated composite tube.

* * * * *